United States Patent
Benfante et al.

(10) Patent No.: US 11,778,052 B1
(45) Date of Patent: Oct. 3, 2023

(54) SYSTEMS AND METHODS FOR AUTOMATICALLY CONNECTING MANAGED DEVICES

(71) Applicant: Verizon Patent and Licensing Inc., Basking Ridge, NJ (US)

(72) Inventors: Dennis Benfante, Alpharetta, GA (US); Isaac Alexander Calvo, Bridgewater, NJ (US); Steven Mancuso, Lebanon, NJ (US); Shyam T. Shyamalan, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/048,948

(22) Filed: Oct. 24, 2022

(51) Int. Cl.
*H04L 67/306* (2022.01)
*H04W 4/21* (2018.01)
*H04W 4/70* (2018.01)
*H04W 4/80* (2018.01)

(52) U.S. Cl.
CPC .......... *H04L 67/306* (2013.01); *H04W 4/21* (2018.02); *H04W 4/70* (2018.02); *H04W 4/80* (2018.02)

(58) Field of Classification Search
None
See application file for complete search history.

(56) References Cited

U.S. PATENT DOCUMENTS

| 2010/0063889 A1* | 3/2010 | Proctor, Jr. | H04W 4/21 705/26.1 |
| 2018/0184479 A1* | 6/2018 | Motto | H04W 12/06 |
| 2021/0021423 A1* | 1/2021 | Latorre | G06Q 30/018 |

OTHER PUBLICATIONS

Echeverria et al., "Establishing Trusted Identities in Disconnected Edge Environments", Oct. 1, 2016, IEEE, 2016 IEEE/ACM Symposium on Edge Computing (SEC) (pp. 51-63) (Year: 2016).*

* cited by examiner

*Primary Examiner* — Davoud A Zand

(57) ABSTRACT

A first user device associated with a first dependent user may receive a request to add a second dependent user associated with a second user device to a contacts list of the first user device, and may provide a first device identifier, identifying the first user device, to the second user device via a short-range communication. The first user device may receive, from the second user device, a second device identifier, identifying the second user device, via a short-range communication, and may provide the second device identifier to an approval system. The first user device may receive, from the approval system, an indication of approval to add the second dependent user to the contacts list, and may add the second dependent user to the contacts list based on the indication. The first user device may communicate with the second user device, via a telecommunications network, based on the contacts list.

20 Claims, 10 Drawing Sheets

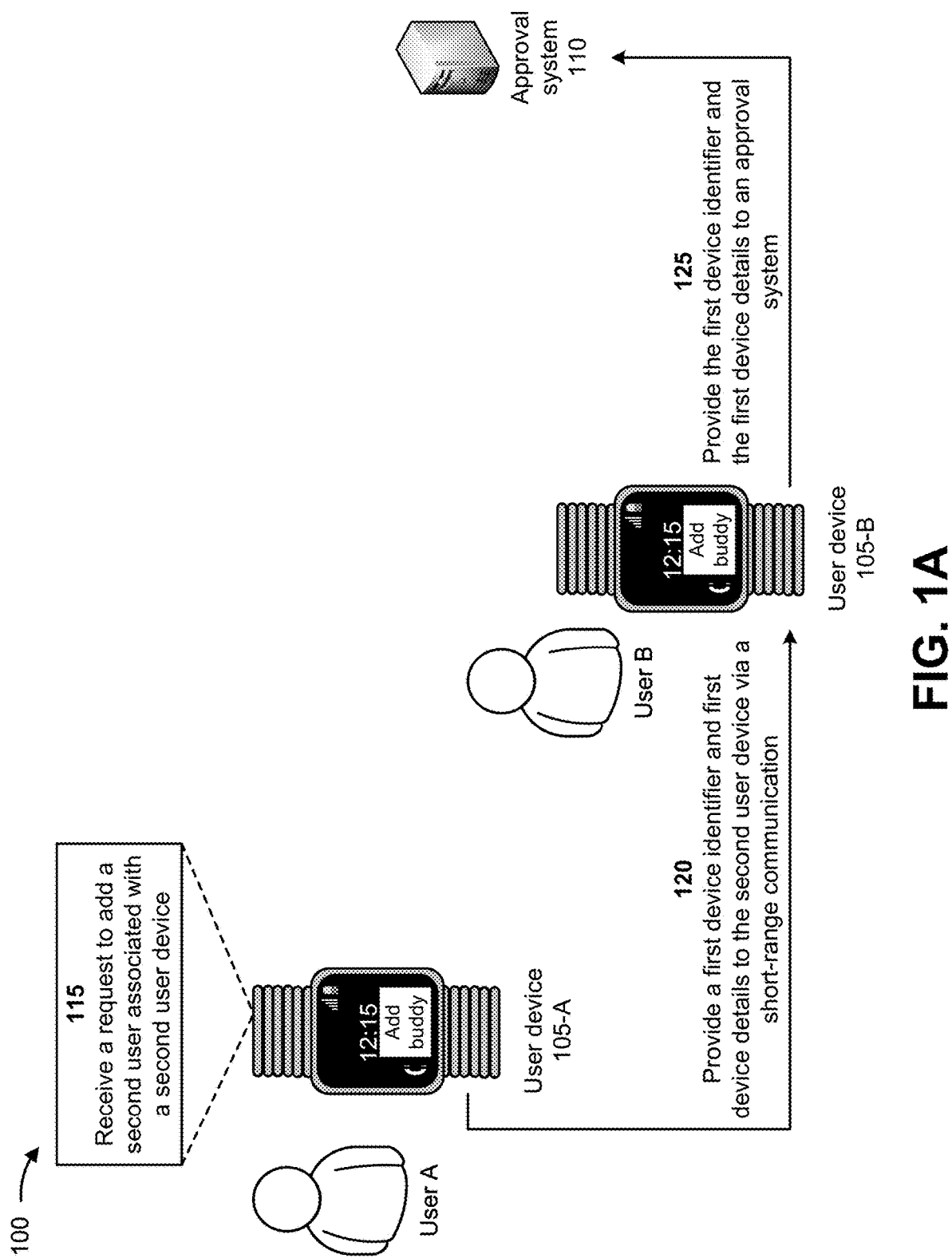

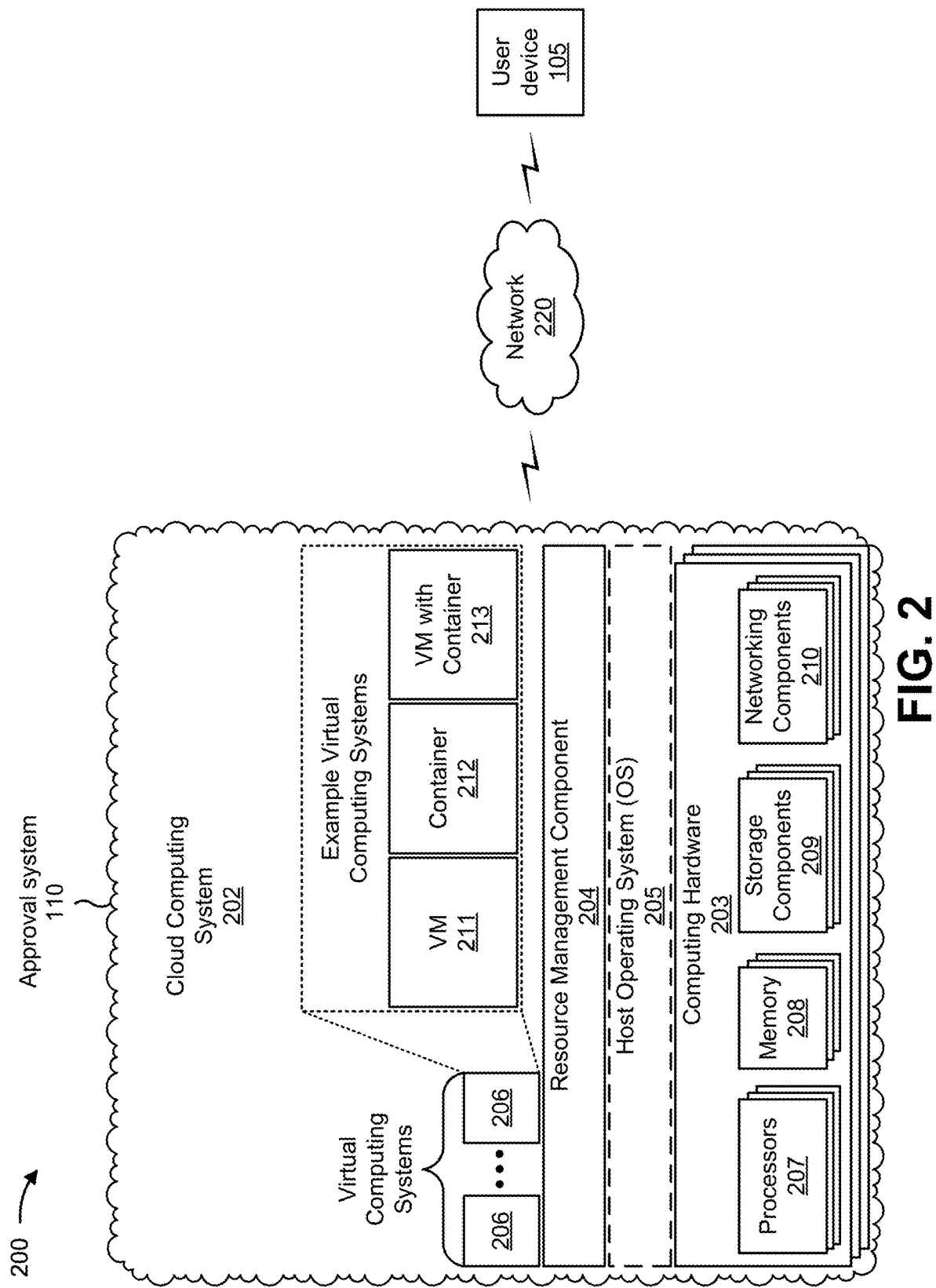

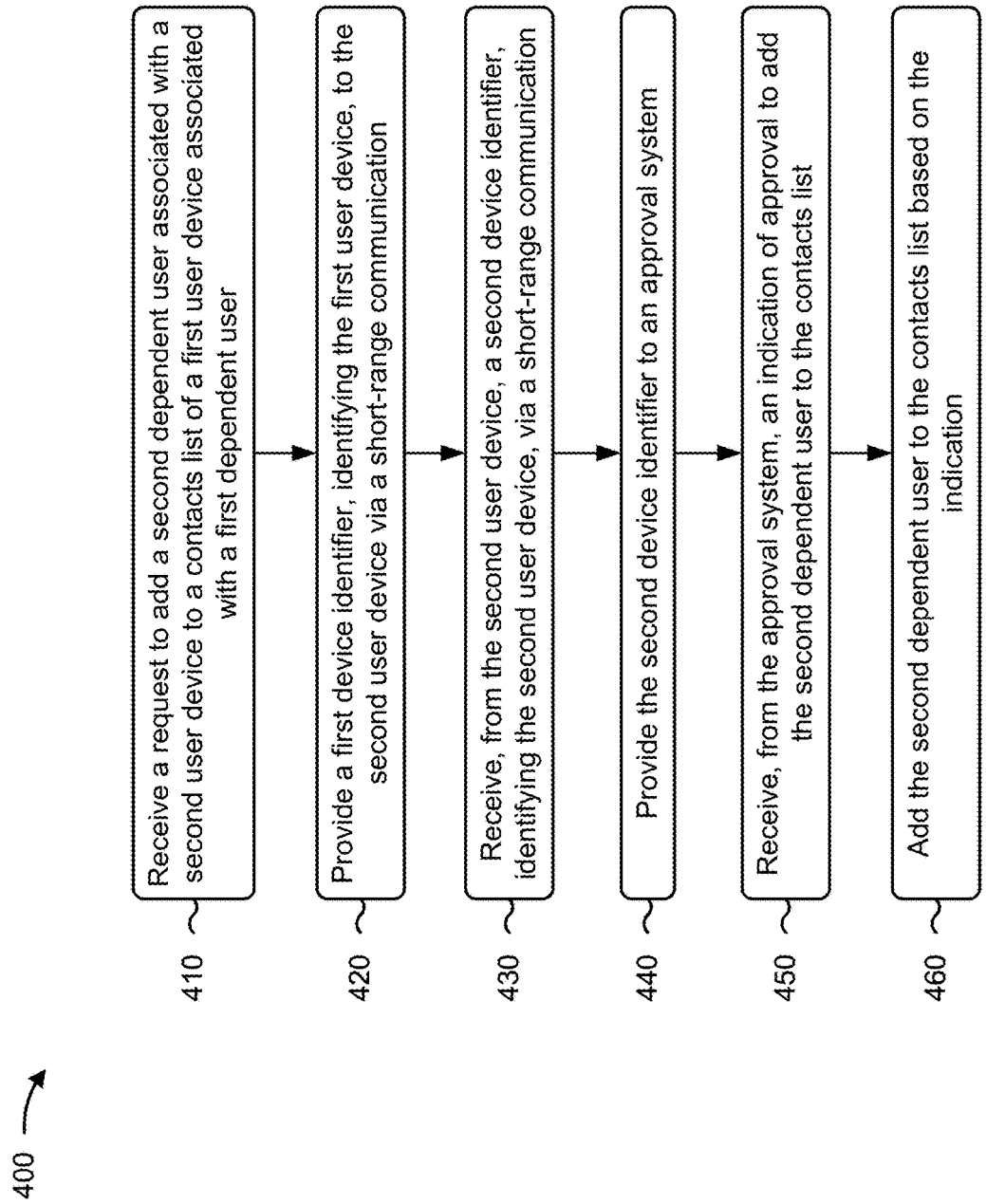

SYSTEMS AND METHODS FOR AUTOMATICALLY CONNECTING MANAGED DEVICES

BACKGROUND

A dependent (e.g., a child, an elderly person, a handicapped person, and/or the like) may rely on a guardian to care for and watch over them. The dependent may have a managed user device (e.g., a wearable device, a smartphone, a tablet, and/or the like) that includes network connectivity and that enables the guardian to care for and watch over the dependent (e.g., via a user device associated with the guardian).

BRIEF DESCRIPTION OF THE DRAWINGS

FIGS. 1A-1G are diagrams of an example associated with automatically connecting managed devices.

FIG. 2 is a diagram of an example environment in which systems and/or methods described herein may be implemented.

FIG. 4 is a flowchart of an example process for automatically connecting managed devices.

DETAILED DESCRIPTION OF EXAMPLE EMBODIMENTS

Figure 1B:
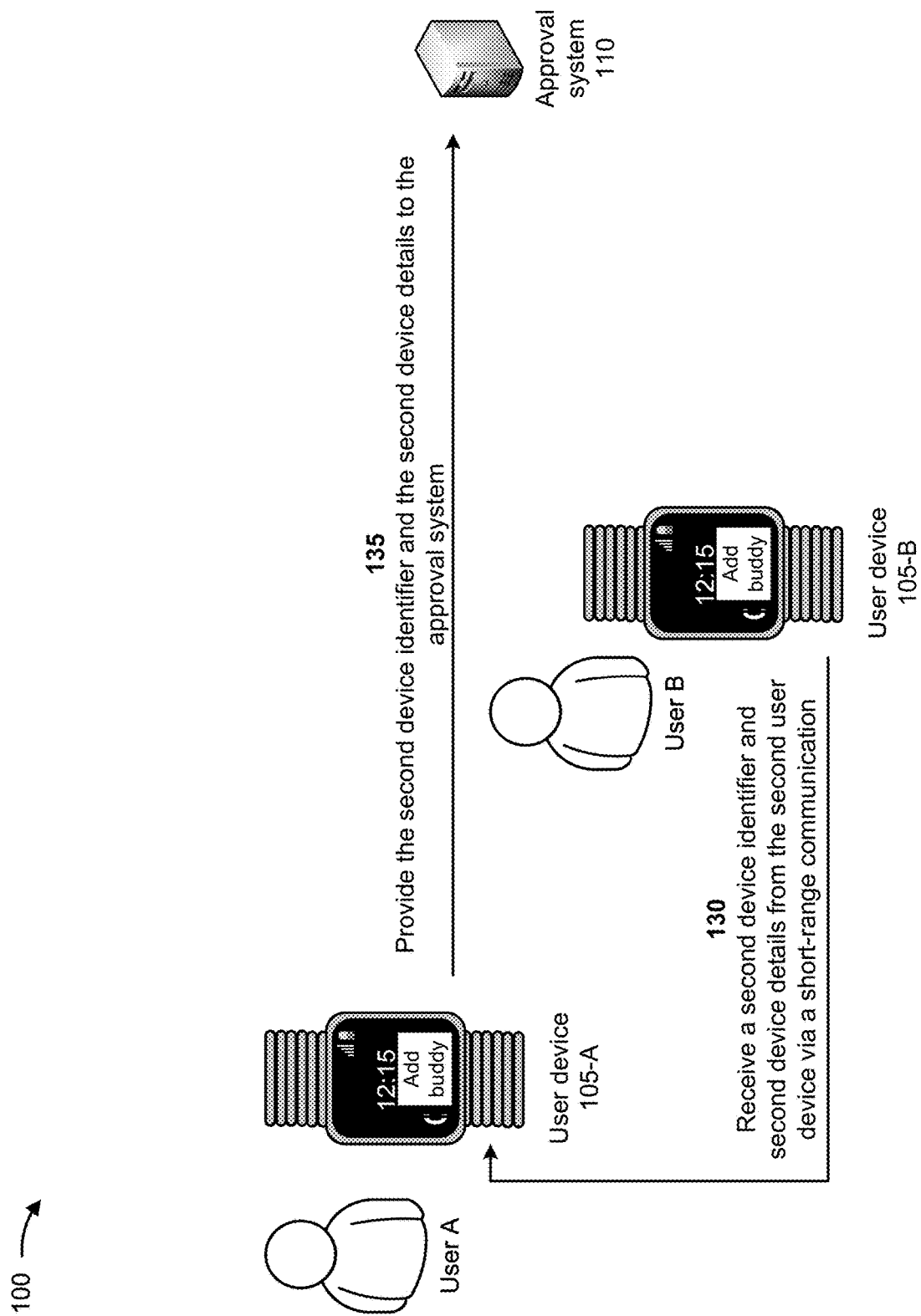

The following detailed description of example implementations refers to the accompanying drawings. The same reference numbers in different drawings may identify the same or similar elements.

A wearable device may include electronic technology or a device incorporated into items that can be comfortably worn on a body (e.g., a wristwatch, a pendant, and/or the like). A wearable device may be used for tracking information on a real-time basis, such as location and health information, and may provide facilities for communication through a network (e.g., text, voice and/or video communications). A wearable device may include sensors that detect daily activity and generate sensor data, and such sensor data may be provided to other user devices (e.g., mobile devices, tablet computers, laptop computers, and/or the like). Some wearable devices (e.g., utilized by dependents) may include a facility that guardians may utilize to protect the dependents. For example, the facility may enable a guardian to control with whom the dependent may communicate via the wearable device (e.g., control the ability to send or receive communications with other wearable devices). This control is typically done through an approved contacts list which limits the communications to or from the device to the devices associated with the identifiers on the approved contacts list.

In practice, managing approved contacts lists is a cumbersome process. In one example, if two dependents (e.g., dependent A and dependent B, each associated with a different wearable device) wish to communicate with each other, the two dependents need to have their wearable devices device details (e.g., device identifiers of the wearable devices) added to the other dependents approved contacts list in order to enable such communication. The control facility in each dependent's wearable device will require that the guardian associated with each user approve the addition of the other user's device information to the approved contacts list. Depending on implementations, this may require manual entry of the device information, entry of guardian credentials to prove that the guardian is making the addition, and coordination between each guardian to have both user's devices updated. This process is complicated where wearable devices have minimal user interface capabilities (e.g., a watch may have a limited display surface and data entry inputs). This is a time consuming, manual, and error-prone process.

Thus, current techniques for connecting guardian-managed wearable devices consume computing resources (e.g., processing resources, memory resources, communication resources, and/or the like), networking resources, and/or other resources associated with wearable devices of dependents sharing device details with guardians, the guardians approving the device details of the wearable devices, the user devices enabling the wearable devices to communicate after approval of the device details of the wearable devices, and/or the like.

Some implementations described herein provide a user device (e.g., a guardian-managed user device of a dependent) that automatically connects guardian-managed devices. For example, a first user device associated with a first dependent user may receive a request to add a second dependent user associated with a second user device to a contacts list of the first user device, and may provide a first device identifier, identifying the first user device, to the second user device via a short-range wireless communication. The first user device may receive, from the second user device, a second device identifier, identifying the second user device, via a short-range wireless communication, and may provide the second device identifier to an approval system. The first user device may receive, from the approval system, an indication of approval to add the second dependent user to the approved contacts list, and may add information identifying the second dependent user to the approved contacts list based on the indication. The first user device may communicate with the second user device, via a telecommunications network, based on adding the information identifying the second dependent user to the approved contacts list.

In this way, the user device automatically connects guardian-managed devices. For example, a first user device associated with a first dependent user may receive a request to add a second dependent user associated with a second user device to an approved contacts list, and may provide a first user device identifier to the second user device via a short-range communication. The first user device may receive a second user device identifier via the short-range wireless communication, and may provide the second user device identifier to an approval system. The first user device may receive, from the approval system, an indication of approval to add the second dependent user to the approved contacts list, and may add the second dependent user to the approved contacts list based on the indication. Thus, the user device may conserve computing resources, networking resources, and/or other resources that would have otherwise been consumed by wearable devices of dependents sharing device details with guardians, the guardians approving the device details of the wearable devices, the user devices enabling the wearable devices to communicate after approval of the device details of the wearable devices, and/or the like.

Figure 1C:
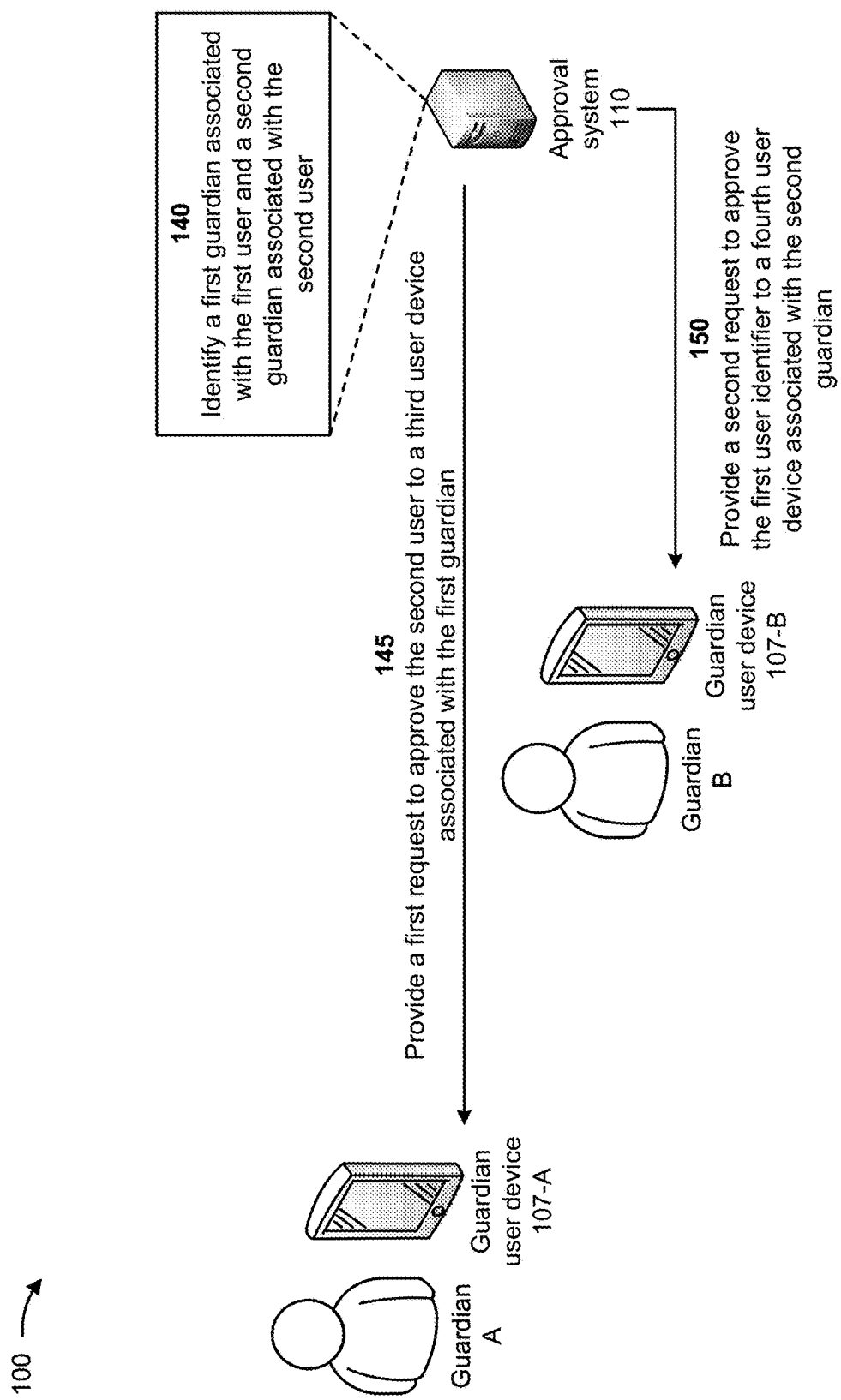

FIGS. 1A-1G are diagrams of an example 100 associated with automatically connecting guardian-managed devices. As shown in FIGS. 1A-1G, example 100 includes a first user device 105-A associated with a first user (e.g., user A), and a second user device 105-B associated with a second user (e.g., user B). The first user may be a dependent of a first guardian (e.g., guardian A) that manages utilization of the first user device 105-A, and the second user may be a dependent of a second guardian (e.g., guardian B) that manages utilization of the second user device 105-B. The first guardian may be associated with a third user device (e.g., a first guardian user device 107-A), and the second guardian may be associated with a fourth user device (e.g., a second guardian user device 107-B), as shown in FIG. 1C. The first user device 105-A, the second user device 105-B, the first guardian user device 107-A, and the second guardian user device 107-B may be referred as user devices 105/107 (e.g., or user device 105/107) and may be associated with an approval system. Further details of the user devices 105/107 and the approval system 110 are provided elsewhere herein.

As shown in FIG. 1A, and by reference number 115, the first user device 105-A may receive a request to add the second user associated with the second user device 105-B (e.g., to a contacts list of the first user device 105-A). For example, the first user device 105-A and the second user device 105-B may include control facilities (e.g., applications) that only enable the first user device 105-A and the second user device 105-B to communicate (e.g., via a telecommunications network, text messaging, instant messaging, and/or the like) when the first guardian approves the second dependent user and the second guardian approves the first dependent user. In some implementations, the control application may provide a feature that, when enabled, may allow the first user device 105-A to enable short-range wireless communication (e.g., a personal area network (PAN) (e.g., Bluetooth), near-field communication (NFC), and/or the like) for the first user device 105-A. When the short-range wireless communication is the PAN (e.g., Bluetooth), the first user device 105-A may utilize the PAN (e.g., a Bluetooth communication) to locate other user devices 105 that include the application and also have short-range wireless communications (such as a Bluetooth PAN) enabled. For example, information identifying the second user device 105-B may be displayed by the first user device 105-A to the first user, and the first user may select the information identifying the second user device 105-B. When the first user selects the information, the first user device 105-A may receive the request to add the second user associated with the second user device 105-B to the contacts list of the first user device 105-A. In some implementations, the first user device 105-A may display a selection mechanism (e.g., an "Add buddy" icon, link, button, and/or the like) that, when selected, may generate the request to add the second user associated with the second user device 105-B to the contacts list of the first user device 105-A. The second user device 105-B may utilize the PAN (e.g., a Bluetooth communication) in a similar manner to generate a request to add the first user associated with the first user device 105-A to a contacts list of the second user device 105-B.

When the short-range communication is NFC, the first user and/or the second user may cause the first user device 105-A to physically contact the second user device 105-B. When the first user device 105-A physically contacts the second user device 105-B, the NFC may cause the first user device 105-A to generate the request to add the second user associated with the second user device 105-B to the contacts list of the first user device 105-A. Similarly, when the first user device 105-A physically contacts the second user device 105-B, the NFC may cause the second user device 105-B to generate a request to add the first user associated with the first user device 105-A to a contacts list of the second user device 105-B.

As further shown in FIG. 1A, and by reference number 120, the first user device 105-A may provide a first device identifier and first device details to the second user device 105-B via a short-range communication. For example, the first user device 105-A may be identified with the first device identifier, such as a mobile directory number (MDN), a mobile identification number (MIN), a mobile subscription identification number (MSIN), an international mobile equipment identity (IMEI), and/or the like. The first user device 105-A may be associated with the first device details, such as a type associated with the first user device 105-A, information identifying the first user, capabilities of the first user device 105-A, and/or the like. In some implementations, when the first user device 105-A selects the information identifying the second user device 105-B (e.g., when the PAN (e.g., Bluetooth) is enabled), the application may cause the first user device 105-A to provide the first device identifier and the first device details to the second user device 105-B via the PAN (e.g., Bluetooth) communication. In some implementations, when the first user device 105-A physically contacts the second user device 105-B (e.g., when NFC is enabled), the application may cause the first user device 105-A to provide the first device identifier and the first device details to the second user device 105-B via the NFC communication. In some implementations, the first user device 105-A may provide the first device identifier and the first device details to the second user device 105-B in a secure manner (e.g., via encryption or other security mechanism), and the second user device 105-B may receive the first device identifier and the first device details.

As further shown in FIG. 1A, and by reference number 125, the second user device 105-B may provide the first device identifier and the first device details to the approval system 110. For example, the second user device 105-B may receive the first device identifier and the first device details from the first user device 105-A (e.g., in an encoded format, such as an encrypted format), and may decode the first device identifier and the first device details. The second user device 105-B may provide the decoded first device identifier and the decoded first device details to the approval system 110 over a network.

As shown in FIG. 1B, and by reference number 130, the first user device 105-A may receive a second device identifier and second device details from the second user device 105-B via a short-range wireless communication. For example, the second user device 105-B may be identified with the second device identifier, such as an MDN, an MIN, an MSIN, an IMEI, and/or the like. The second user device 105-B may be associated with the second device details, such as a type associated with the second user device 105-B, information identifying the second user, capabilities of the second user device 105-B, and/or the like. In some implementations, when the second user device 105-B selects the information identifying the first user device 105-A (e.g., when the PAN (e.g., Bluetooth) is enabled), the application may cause the second user device 105-B to provide the second device identifier and the second device details to the first user device 105-A via the PAN (e.g., Bluetooth) communication. In some implementations, when the second user device 105-B physically contacts the first user device 105-A (e.g., when NFC is enabled), the application may cause the second user device 105-B to provide the second device identifier and the second device details to the first user device 105-A via the NFC communication. In some implementations, the second user device 105-B may provide the second device identifier and the second device details to the first user device 105-A in a secure manner (e.g., via encryption or other security mechanism), and the first user device 105-A may receive the second device identifier and the second device details.

As further shown in FIG. 1B, and by reference number 135, the first user device 105-A may provide the second device identifier and the second device details to the approval system 110. For example, the first user device 105-A may receive the second device identifier and the second device details from the second user device 105-B (e.g., in an encoded format, such as an encrypted format), and may decode the second device identifier and the second device details. The first user device 105-A may provide the decoded second device identifier and the decoded second device details to the approval system 110 over a network.

As shown in FIG. 1C, and by reference number 140, the approval system 110 may identify a first guardian associated with the first user and a second guardian associated with the second user. For example, the approval system 110 may be associated with a data structure (e.g., a database, a list, a table, and/or the like) that stores information associating the device identifiers and/or device details with users, guardians of users, and guardian user devices 107 of the guardians. The approval system 110 may receive the first device identifier, the first device details, the second device identifier, and the second device details, and may utilize the data structure to identify the first user based on the first device identifier and/or the first device details. The approval system 110 may also utilize the data structure to identify the first guardian associated with the first user. The approval system 110 may utilize the data structure to identify the second user based on the second device identifier and/or the second device details, and may also utilize the data structure to identify the second guardian associated with the second user. The approval system 110 may utilize the data structure to identify the first guardian user device 107-A associated with the first guardian, and to identify the second guardian user device 107-B associated with the second guardian.

As further shown in FIG. 1C, and by reference number 145, the approval system 110 may provide a first request to the third user device associated with the first guardian, the first request being a request for approval to add the second user to an approved contact list for the first user. For example, the approval system 110 may generate the first request to approve the second user based on receiving the second device identifier and the second device details from the first user device 105-A and based on identifying the first guardian associated with the first user. The approval system 110 may provide the first request to approve the second user to the third user device (e.g., the first guardian user device 107-A) associated with the first guardian (e.g., guardian A). The third device may be one or more devices associated with the first guardian, and in some implementations, the approval system may send the request to all of the devices associated with the first guardian or some subset of the devices (e.g., based on priority, time of day, geography, etc.)

As further shown in FIG. 1C, and by reference number 150, the approval system 110 may provide a second request to the fourth user device associated with the second guardian, the second request being a request for approval to add the first user to an approved contact list for the second user. For example, the approval system 110 may generate the second request to approve the first user based on receiving the first device identifier and the first device details from the second user device 105-B and based on identifying the second guardian associated with the second user. The approval system 110 may provide the second request to approve the first user to the fourth user device (e.g., the second guardian user device 107-B) associated with the second guardian (e.g., guardian B). The fourth device may be one or more devices associated with the second guardian, and in some implementations, the approval system may send the request to all of the devices associated with the second guardian or some subset of the devices (e.g., based on priority, time of day, geography, etc.)

Figure 1D:
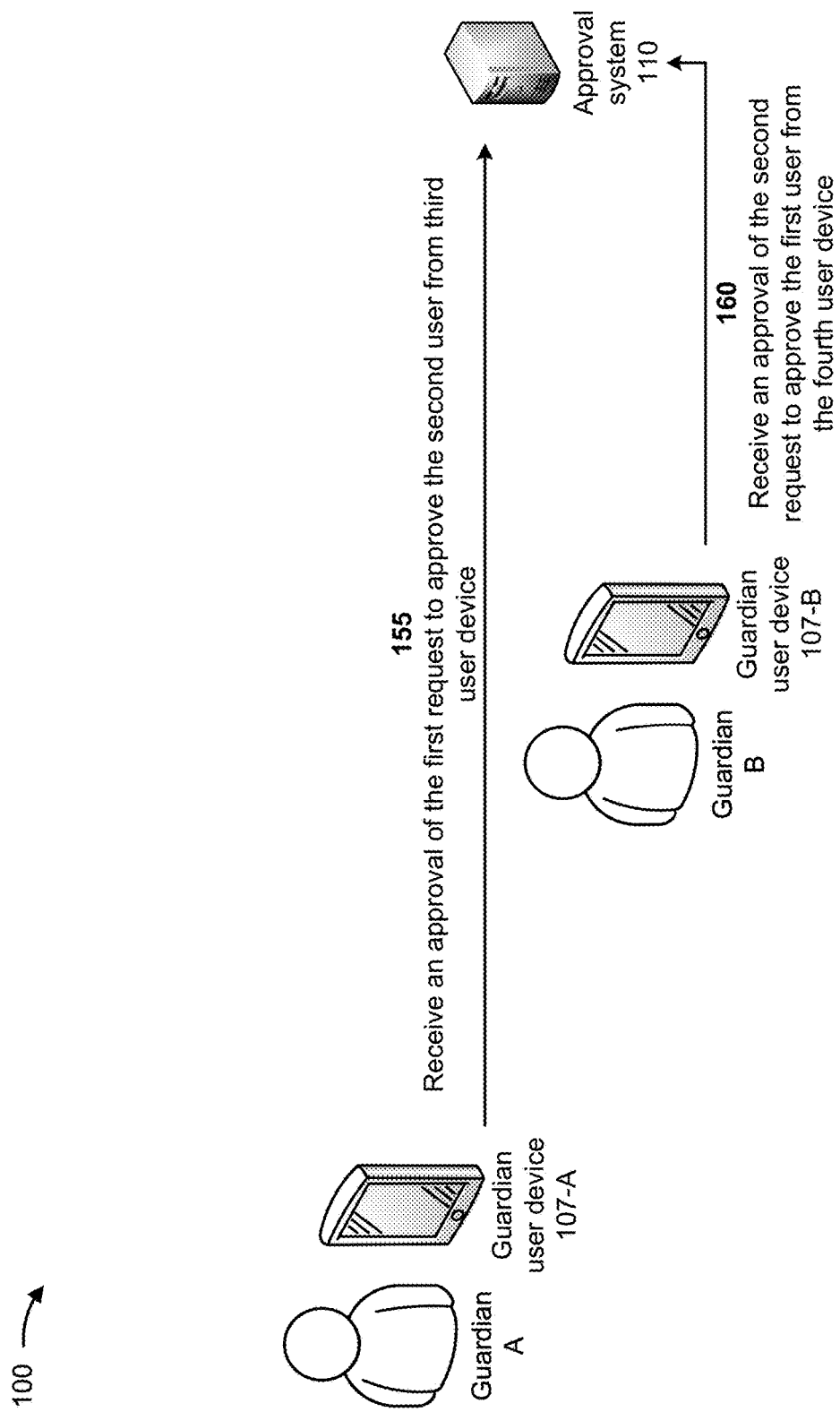

As shown in FIG. 1D, and by reference number 155, the approval system 110 may receive from third user device an approval of the first request to approve the addition of the second user to the first user's approved contact list. For example, the third user device (e.g., the first guardian user device 107-A) may receive the first request to approve the second user, and may provide the first request for display to the first guardian. The first guardian may provide, to the first guardian user device 107-A, information indicating the approval of the first request, and may cause the first guardian user device 107-A to provide the approval of the first request to approve the second user to the approval system 110. The approval system 110 may receive the approval of the first request to approve the second user from the first guardian user device 107-A. Alternatively, the first guardian may provide, to the first guardian user device 107-A, information indicating the disapproval of the first request, and may cause the first guardian user device 107-A to provide the disapproval of the first request to approve the second user to the approval system 110. The approval system 110 may receive the disapproval of the first request to approve the second user from the first guardian user device 107-A. In such instances, the approval system 110 may notify the first user (e.g., via the first user device 105-A) that the second user is not approved for communication with the first user. In some implementations, the approval system 110 may also notify the second guardian (e.g., via the second guardian user device 107-B) and the second user (e.g., via the second user device 105-B) that the second user is not approved for communication with the first user.

As further shown in FIG. 1D, and by reference number 160, the approval system 110 may receive from the fourth user device an approval of the second request to approve the addition of the first user to the second user's approved contacts list. For example, the fourth user device (e.g., the second guardian user device 107-B) may receive the second request to approve the first user, and may provide the second request for display to the second guardian. The second guardian may provide, to the second guardian user device 107-B, information indicating the approval of the second request, and may cause the second guardian user device 107-B to provide the approval of the second request to approve the first user to the approval system 110. The approval system 110 may receive the approval of the second request to approve the first user from the second guardian user device 107-B. Alternatively, the second guardian may provide, to the second guardian user device 107-B, information indicating the disapproval of the second request, and may cause the second guardian user device 107-B to provide the disapproval of the second request to approve the first user to the approval system 110. The approval system 110 may receive the disapproval of the second request to approve the first user from the second guardian user device 107-B. In such instances, the approval system 110 may notify the second user (e.g., via the second user device 107-B) that the first user is not approved for communication with the second user. In some implementations, the approval system 110 may also notify the first guardian (e.g., via the first guardian user device 107-A) and the first user (e.g., via the first user device 105-A) that the first user is not approved for communication with the second user.

Figure 1E:
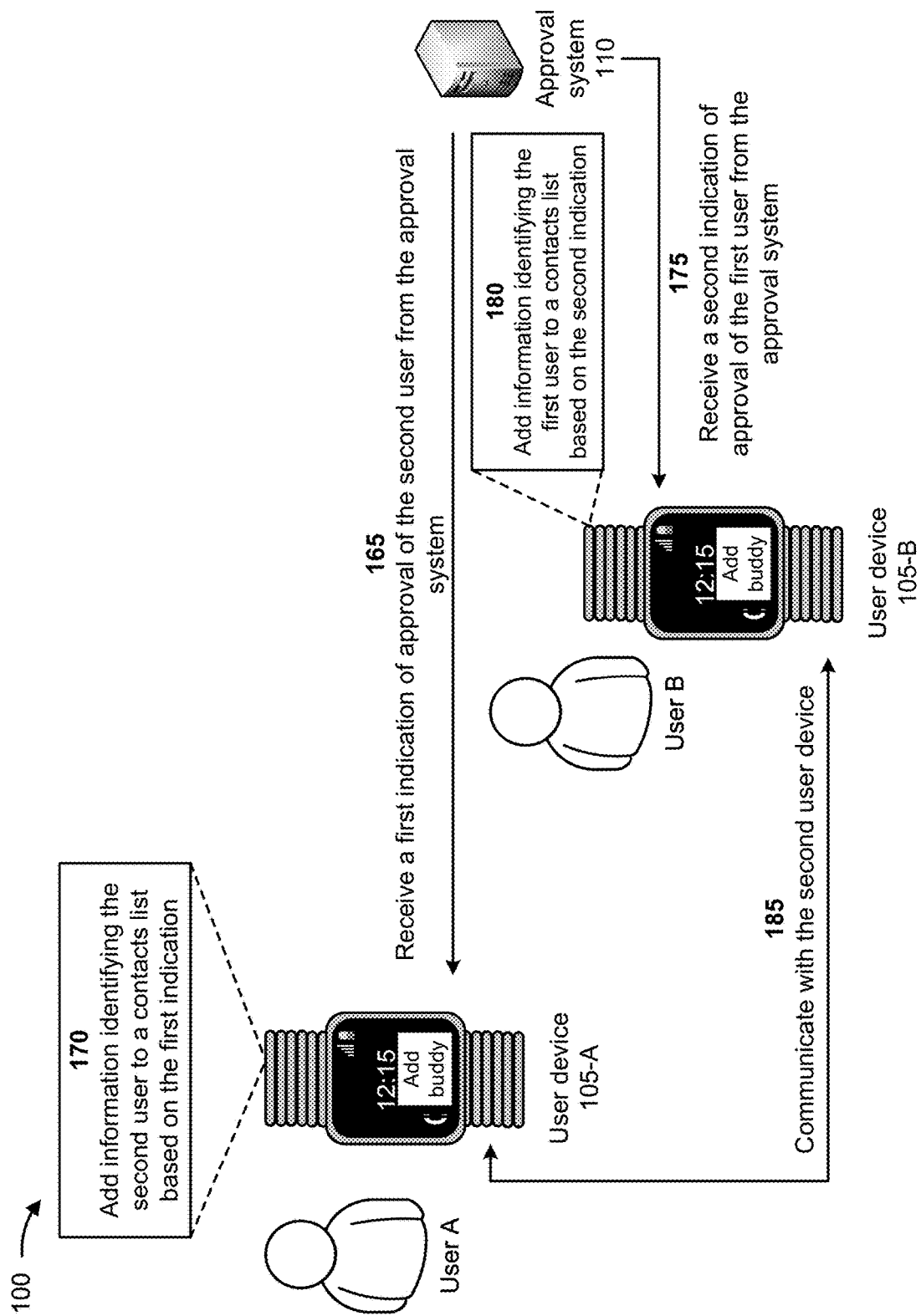

As shown in FIG. 1E, and by reference number 165, the first user device 105-A may receive a first indication of approval of the second user from the approval system 110. For example, when the approval system 110 receives the approval of the first request to approve the second user from the first guardian user device 107-A, the approval system 110 may generate the first indication of approval of the second user. The approval system 110 may provide the first indication of approval of the second user to the first user device 105-A over a network, and the first user device 105-A may receive the first indication of approval of the second user from the approval system 110.

As further shown in FIG. 1E, and by reference number 170, the first user device 105-A may add the second user to an approved contacts list based on the first indication. For example, when the first user device 105-A receives the first indication of approval of the second user from the approval system 110, the control application may cause the first user device 105-A to add information associated with the second user and/or the second user device 105-B to the approved contacts list of the first user device 105-A.

As further shown in FIG. 1E, and by reference number 175, the second user device 105-B may receive a second indication of approval of the first user from the approval system 110. For example, when the approval system 110 receives the approval of the second request to approve the first user from the second guardian user device 107-B, the approval system 110 may generate the second indication of approval of the first user. The approval system 110 may provide the second indication of approval of the first user to the second user device 105-B over a network, and the second user device 105-B may receive the second indication of approval of the first user from the approval system 110.

As further shown in FIG. 1E, and by reference number 180, the second user device 105-B may add the first user to an approved contacts list based on the second indication. For example, when the second user device 105-B receives the second indication of approval of the first user from the approval system 110, the application may cause the second user device 105-B to add information associated with the first user and the first user device 105-A to the approved contacts list of the second user device 105-B.

In some implementations, the approval system 110 may only send the first indication of approval to the first user device and the second indication of approval to the second user device if both the approvals from the guardians have been received. In some implementations the approval system 110 may send the first indication of approval to the first user device once the approval from the first guardian device has been received, and may send the second indication of approval to the second user device when the approval from the second guardian device has been received.

As further shown in FIG. 1E, and by reference number 185, the first user device 105-A may communicate with the second user device 105-B. For example, once the first user device 105-A adds the second user to its approved contacts list and the second user device 105-B adds the first user to its approved contacts list, the first user device 105-A and the second user device 105-B may communicate (e.g., via a telecommunications network, a text messaging system, an instant messaging system, and/or the like). In some implementations, the first user may cause the first user device 105-A to initiate a communication with the second user device 105-B by selecting the information identifying the second user and/or the second user device 105-B. Alternatively, the second user may cause the second user device 105-B to initiate a communication with the first user device 105-A by selecting the information identifying the first user and/or the first user device 105-A.

Figure 1F:
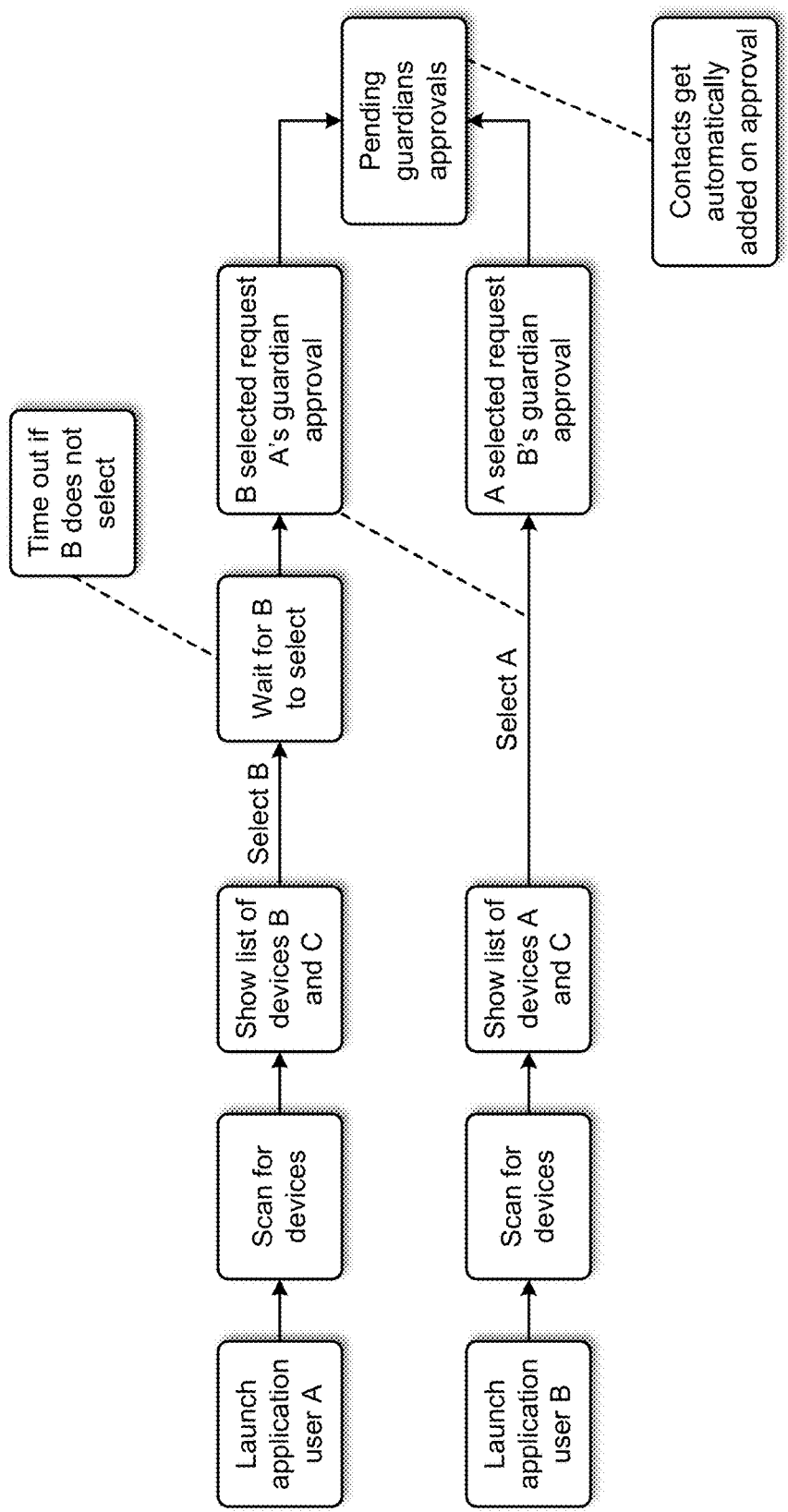

FIG. 1F an example process flow associated with automatically connecting guardian-managed devices. Each guardian-managed device includes a control facility, such as a control application, to implement guardian control features. As shown, the first user (e.g., user A) may launch a connection feature of the control application on the first user device 105-A, and the second user (e.g., user B) may launch a connection feature of the control application on the second user device 105-B. The first user device 105-A may scan for devices proximate to the first user device 105-A and may display a list of devices proximate to the first user device 105-A (in this example, it detects the second user device 105-B and another user device 105-C). The second user device 105-B may scan for devices proximate to the second user device 105-B and may display a list of devices proximate to the second user device 105-B (in this example, the first user device 105-A and the other user device 105-C). The first user may select the second user device 105-B from the list of devices and the second user may select the first user device 105-A from the list of devices. The first user device 105-A may wait for the second user to select the first user device 105-A for a time period, and the selection of the second user device 105-B from the list of devices may time out when the time period expires.

As further shown in FIG. 1F, when the second user selects the first user device 105-A from the list of devices, the first user device 105-A may request approval the second user from the first guardian (e.g., guardian A) and the second user device 105-B may request approval of the first user from the second guardian (e.g., guardian B). The approval system 110 may handle obtaining the approvals from the first guardian and the second guardian, as described above. When the approvals from the first guardian and the second guardian are obtained, the information identifying the second user may be added to the contacts list of the first user device 105-A, and the information identifying the first user may be added to the contacts list of the second user device 105-B.

Figure 1G:
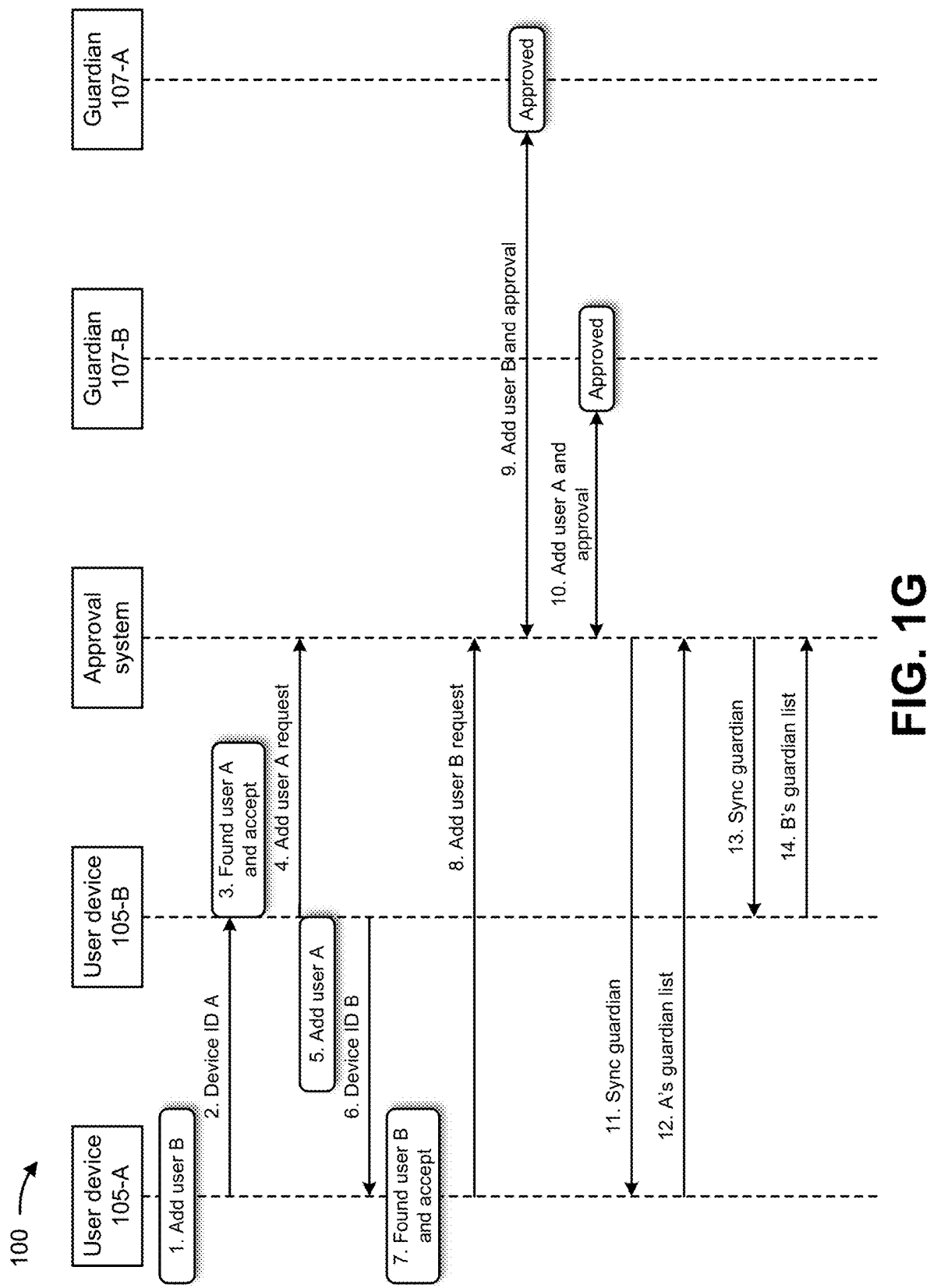

FIG. 1G is an example call flow diagram associated with automatically connecting guardian-managed devices. As shown at step 1 of FIG. 1G, the first user device 105-A may receive a request to add the second user (e.g., user B) to the approved contacts list of the first user device 105-A. As shown at step 2, the first user device 105-A may provide the first device identifier and the first device details to the second user device 105-B based on the request. As shown at step 3, the second user device 105-B may identify the first user device 105-A and may accept the request to add the second user to the approved contacts list of the first user device 105-A. As shown at steps 4 and 5, the second user device 105-B may provide, to the approval system 110, a request for approval to add the first user (e.g., user A) to the approved contacts list of the second user device 105-B, and may receive a request to add the first user (e.g., user A) to the approved contacts list of the first user device 105-A.

As shown at step 6 of FIG. 1G, the second user device 105-B may provide the second device identifier and the second device details to the first user device 105-A based on the request to add the first user. As shown at step 7, the first user device 105-A may identify the second user device 105-B and may accept the request to add the first user to the approved contacts list of the second user device 105-B. As shown at step 8, the first user device 105-A may provide, to the approval system 110, a request for approval to add the second user (e.g., user B) to the approved contacts list of the first user device 105-A.

As shown at step 9, the approval system 110 may request approval of adding the second user to the approved contacts list of the first user device 105-A, and may receive approval from the first guardian via the first guardian user device 107-A. As shown at step 10, the approval system 110 may request approval of adding the first user to the approved contacts list of the second user device 105-B, and may receive approval from the second guardian via the second guardian user device 107-B. As shown at steps 11 and 12, the approval system 110 may provide a request to synchronize the guardian list associated with the first user device 105-A, and may receive the guardian list from the first user device 105-A. As shown at steps 13 and 14, the approval system 110 may provide a request to synchronize the guardian list associated with the second user device 105-B, and may receive the guardian list from the second user device 105-B.

In this way, a user device 105 automatically connects managed devices. For example, a first user device 105-A associated with a first dependent user may receive a request to add a second dependent user associated with a second user device 105-B to a contacts list, and may provide a first user device identifier to the second user device 105-B via a short-range communication. The first user device 105-A may receive a second user device identifier via the short-range communication, and may provide the second user device identifier to the approval system 110. The first user device 105-A may receive, from the approval system 110, an indication of approval to add the second dependent user to the contacts list, and may add the second dependent user to the contacts list based on the indication. Thus, the user device 105 may conserve computing resources, networking resources, and/or other resources that would have otherwise been consumed by wearable devices 105 of dependents sharing device details with user devices 105 of guardians, the user devices 105 of the guardians approving the device details of the wearable devices 105, the user devices 105 of the guardians enabling the wearable devices 105 to communicate after approval of the device details of the wearable devices 105, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

FIG. 2 is a diagram of an example environment 200 in which systems and/or methods described herein may be implemented. As shown in FIG. 2, the environment 200 may include the approval system 110, which may include one or more elements of and/or may execute within a cloud computing system 202. The cloud computing system 202 may include one or more elements 203-213, as described in more detail below. As further shown in FIG. 2, the environment 200 may include the user device 105/107 and/or a network 220. Devices and/or elements of the environment 200 may interconnect via wired connections and/or wireless connections.

The user device 105/107 includes one or more devices capable of receiving, generating, storing, processing, and/or providing information, such as information described herein. For example, the user device 105/107 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the approval system 110 may include one or more elements 203-213 of the cloud computing system 202, may execute within the cloud computing system 202, and/or may be hosted within the cloud computing system 202, in some implementations, the approval system 110 may not be cloud-based (e.g., may be implemented outside of a cloud computing system) or may be partially cloud-based. For example, the approval system 110 may include one or more devices that are not part of the cloud computing system 202, such as the device 300 of FIG. 3, which may include a standalone server or another type of computing device. The approval system 110 may perform one or more operations and/or processes described in more detail elsewhere herein.

The network 220 may include one or more wired and/or wireless networks. For example, the network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
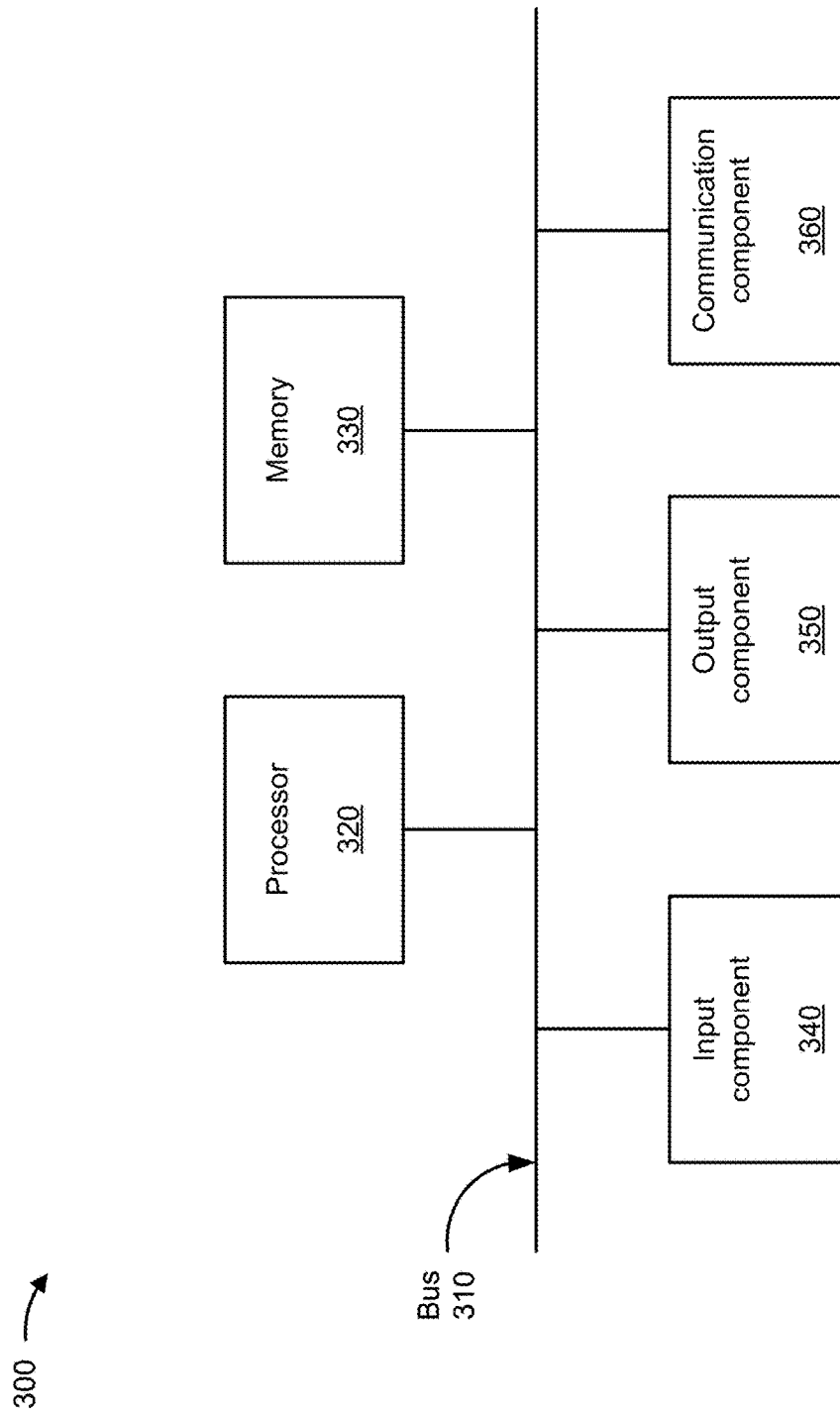
FIG. 3 is a diagram of example components of one or more devices of FIG. 2.

FIG. 3 is a diagram of example components of a device 300, which may correspond to the user device 105/107 and/or the approval system 110. In some implementations, the user device 105/107 and/or the approval system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for automatically connecting managed devices. In some implementations, one or more process blocks of FIG. 4 may be performed by a first user device (e.g., the first user device 105-A). In some implementations, one or more process blocks of FIG. 4 may be performed by another device or a group of devices separate from or including the first user device, such as an approval system (e.g., the approval system 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a request to add a second dependent user associated with a second user device to a contacts list of the first user device (block 410). For example, the first user device may receive a request to add a second dependent user associated with a second user device to a contacts list of the first user device, as described above. In some implementations, receiving the request to add the second dependent user associated with the second user device includes receiving the request to add the second dependent user via the short-range communication with the second user device. In some implementations, receiving the request to add the second dependent user associated with the second user device includes receiving, via the short-range communication, information identifying the second user device; receiving a selection of the information identifying the second user device; and receiving the request to add the second dependent user based on the selection of the information identifying the second user device.

In some implementations, receiving the request to add the second dependent user associated with the second user device includes receiving the request to add the second dependent user based the first user device physically contacting the second user device. In some implementations, the first user device is a wearable device. In some implementations, the first user device is a smart watch managed by a guardian of the first dependent user.

As further shown in FIG. 4, process 400 may include providing a first device identifier, identifying the first user device, to the second user device via a short-range communication (block 420). For example, the first user device may provide a first device identifier, identifying the first user device, to the second user device via a short-range communication, as described above. In some implementations, providing the first device identifier, identifying the first user device, to the second user device via the short-range communication includes providing the first device identifier and first device details, identifying details of the first user device, to the second user device via the short-range communication. In some implementations, the second user device is configured to provide the first device identifier to the approval system. In some implementations, the short-range communication is one of a personal area network communication or a near-field communication.

As further shown in FIG. 4, process 400 may include receiving, from the second user device, a second device identifier, identifying the second user device, via a short-range communication (block 430). For example, the first user device may receive, from the second user device, a second device identifier, identifying the second user device, via a short-range communication, as described above.

As further shown in FIG. 4, process 400 may include providing the second device identifier to an approval system (block 440). For example, the first user device may provide the second device identifier to an approval system, as described above.

As further shown in FIG. 4, process 400 may include receiving, from the approval system, an indication of approval to add the second dependent user to the contacts list (block 450). For example, the first user device may receive, from the approval system, an indication of approval to add the second dependent user to the contacts list, as described above. In some implementations, receiving the indication of approval to add the second dependent user to the contacts list includes receiving the indication of approval to add the second dependent user to the contacts list based on an approval by a guardian of the first dependent user.

As further shown in FIG. 4, process 400 may include adding information identifying the second dependent user to the contacts list based on the indication (block 460). For example, the first user device may add information identifying the second dependent user to the contacts list based on the indication, as described above. In some implementations, the second user device is configured to receive another indication of approval of the first dependent user from the approval system, and to add the information identifying the first dependent user to a contacts list of the second user device based on the other indication. In some implementations, the approval system is configured to obtain approval of a first guardian, associated with the first dependent user, to add the information identifying the second dependent user to the contacts list of the first user device and to obtain approval of a second guardian, associated with the second dependent user, to add the information identifying the first dependent user to a contacts list of the second user device.

In some implementations, process 400 includes communicating by the first user device and with the second user device, via a telecommunications network, based on adding the information identifying the second dependent user to the contacts list.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a first user device associated with a first dependent user, a request to add a second dependent user associated with a second user device to a contacts list of the first user device;
   providing, by the first user device, a first device identifier, identifying the first user device, to the second user device via a short-range communication;
   receiving, by the first user device and from the second user device, a second device identifier, identifying the second user device, via a short-range communication;
   providing, by the first user device, the second device identifier to an approval system;
   receiving, by the first user device and from the approval system, an indication of approval to add the second dependent user to the contacts list; and
   adding, by the first user device, information identifying the second dependent user to the contacts list based on the indication.

2. The method of claim 1, further comprising:
   communicating by the first user device and with the second user device, via a telecommunications network, based on adding the information identifying the second dependent user to the contacts list.

3. The method of claim 1, wherein receiving the request to add the second dependent user associated with the second user device comprises:
   receiving the request to add the second dependent user via the short-range communication with the second user device.

4. The method of claim 1, wherein receiving the request to add the second dependent user associated with the second user device comprises:
   receiving, via the short-range communication, information identifying the second user device;
   receiving a selection of the information identifying the second user device; and
   receiving the request to add the second dependent user based on the selection of the information identifying the second user device.

5. The method of claim 1, wherein providing the first device identifier, identifying the first user device, to the second user device via the short-range communication comprises:
   providing the first device identifier and first device details, identifying details of the first user device, to the second user device via the short-range communication.

6. The method of claim 1, wherein the second user device is configured to provide the first device identifier to the approval system.

7. The method of claim 6, wherein the second user device is configured to receive another indication of approval of the first dependent user from the approval system, and to add information identifying the first dependent user to a contacts list of the second user device based on the other indication.

8. A first user device associated with a first dependent user, the first user device comprising:
   one or more processors configured to:
      receive a request to add a second dependent user associated with a second user device to a contacts list of the first user device;
      provide a first device identifier, identifying the first user device, to the second user device via a short-range communication;
      receive, from the second user device, a second device identifier, identifying the second user device, via a short-range communication;
      provide the second device identifier to an approval system;
      receive, from the approval system, an indication of approval to add the second dependent user to the contacts list;
      add information identifying the second dependent user to the contacts list based on the indication; and
      communicate with the second user device, via a telecommunications network, based on adding the information identifying the second dependent user to the contacts list.

9. The first user device of claim 8, wherein the approval system is configured to obtain approval of a first guardian, associated with the first dependent user, to add the second dependent user to the contacts list of the first user device and to obtain approval of a second guardian, associated with the second dependent user, to add the first dependent user to a contacts list of the second user device.

10. The first user device of claim 8, wherein the short-range communication is one of a personal area network or a near-field communication.

11. The first user device of claim 8, wherein the first user device is a wearable device.

12. The first user device of claim 8, wherein the first user device is a smart watch managed by a guardian of the first dependent user.

13. The first user device of claim 8, wherein the one or more processors, to receive the indication of approval to add the second dependent user to the contacts list, are configured to:
  receive the indication of approval to add the second dependent user to the contacts list based on an approval by a guardian of the first dependent user.

14. The first user device of claim 8, wherein the one or more processors, to receive the request to add the second dependent user associated with the second user device, are configured to:
  receive the request to add the second dependent user based the first user device physically contacting the second user device.

15. A non-transitory computer-readable medium storing a set of instructions, the set of instructions comprising:
  one or more instructions that, when executed by one or more processors of a first user device associated with a first dependent user, cause the first user device to:
    receive a request to add a second dependent user associated with a second user device to a contacts list of the first user device;
    provide a first device identifier, identifying the first user device, to the second user device via a short-range communication;
    receive, from the second user device, a second device identifier, identifying the second user device, via a short-range communication;
    provide the second device identifier to an approval system,
      wherein the approval system is configured to obtain approval of a first guardian, associated with the first dependent user, to add the second dependent user to the contacts list of the first user device;
    receive, from the approval system, an indication of approval to add the second dependent user to the contacts list; and
    add information identifying the second dependent user to the contacts list based on the indication.

16. The non-transitory computer-readable medium of claim 15, wherein the one or more instructions further cause the first user device to:
  communicate with the second user device, via a telecommunications network, based on adding the information identifying the second dependent user to the contacts list.

17. The non-transitory computer-readable medium of claim 15, wherein the one or more instructions, that cause the first user device to receive the request to add the second dependent user associated with the second user device, cause the first user device to:
  receive the request to add the second dependent user via the short-range communication with the second user device.

18. The non-transitory computer-readable medium of claim 15, wherein the one or more instructions, that cause the first user device to receive the request to add the second dependent user associated with the second user device, cause the first user device to:
  receive, via the short-range communication, information identifying the second user device;
  receive a selection of the information identifying the second user device; and
  receive the request to add the second dependent user based on the selection of the information identifying the second user device.

19. The non-transitory computer-readable medium of claim 15, wherein the short-range communication is one of a personal area network or a near-field communication.

20. The non-transitory computer-readable medium of claim 15, wherein the one or more instructions, that cause the first user device to receive the request to add the second dependent user associated with the second user device, cause the first user device to:
  receive the request to add the second dependent user based the first user device physically contacting the second user device.

* * * * *